(12) United States Patent
Johnsen et al.

(10) Patent No.: US 7,240,694 B2
(45) Date of Patent: Jul. 10, 2007

(54) FLOW CONTROL VALVE FOR REFRIGERATION SYSTEM

(75) Inventors: Hans Christian Johnsen, Soenderborg (DK); Joergen Holst, Sydals (DK); Mikkel Kloppenborg-Skrumsager, Nordborg (DK)

(73) Assignee: Danfoss A/S, Nordborg (DK)

( * ) Notice: Subject to any disclaimer, the term of this patent is extended or adjusted under 35 U.S.C. 154(b) by 380 days.

(21) Appl. No.: 10/886,687

(22) Filed: Jul. 9, 2004

(65) Prior Publication Data

US 2006/0005890 A1   Jan. 12, 2006

(51) Int. Cl.
*F16K 39/02* (2006.01)

(52) U.S. Cl. ............................ 137/630.15; 137/630.18; 251/267

(58) Field of Classification Search ........... 137/630.13, 137/630.14, 630.15, 630.18; 251/282, 267
See application file for complete search history.

(56) References Cited

U.S. PATENT DOCUMENTS

| | | | | |
|---|---|---|---|---|
| 2,541,176 A * | 2/1951 | Rockwell | ................. | 137/625.3 |
| 2,710,019 A * | 6/1955 | Reasoner et al. | ........... | 137/463 |
| 3,001,551 A * | 9/1961 | Wyser | ......................... | 137/635 |
| 3,347,270 A * | 10/1967 | Cranage | ................. | 137/630.15 |
| 3,575,213 A * | 4/1971 | Schnall | ................... | 137/630.13 |
| 3,624,753 A * | 11/1971 | Brumm | .................. | 137/630.14 |
| 3,631,894 A * | 1/1972 | Frantz | .................... | 137/630.15 |
| 3,700,209 A | 10/1972 | Usry | | |
| 3,888,280 A * | 6/1975 | Tartaglia | ................ | 137/630.13 |
| 4,002,319 A * | 1/1977 | Pool et al. | .................. | 251/282 |
| 4,304,264 A * | 12/1981 | McClintock et al. | .. | 137/630.13 |
| 5,113,902 A * | 5/1992 | Dorr | ........................... | 137/556 |
| 6,460,567 B1 * | 10/2002 | Hansen et al. | ............. | 137/554 |
| 6,568,656 B1 * | 5/2003 | Wrocklage | .................. | 251/282 |
| 2002/0038856 A1 * | 4/2002 | Jorgen et al. | ............... | 251/121 |

* cited by examiner

*Primary Examiner*—Eric Keasel
*Assistant Examiner*—Craig Price
(74) *Attorney, Agent, or Firm*—Buchanan Ingersoll & Rooney PC

(57) ABSTRACT

A flow control valve includes a valve body defining fluid inlet and outlet sections interconnected by a connecting port. A valve unit is disposed in the valve body and is operably connected to an actuator to be moved thereby for opening and closing the connecting port. The valve unit includes a valve element which has a bleed passage extending therethrough for communicating the fluid inlet and outlet sections with one another. A bleed piston is operably connected to the actuator and is movable thereby relative to the valve element for opening the bleed passage when the valve unit is in a port-closing position. The valve unit also includes a pressure balancing passage which communicates front and rear ends of the valve element with one another and tending to aid in statically and dynamically balancing the fluid pressures acting on the valve element.

15 Claims, 6 Drawing Sheets

FLOW CONTROL VALVE FOR REFRIGERATION SYSTEM

BACKGROUND OF THE INVENTION

The present invention relates to a flow control valve, especially for use in refrigeration systems for controlling the flow of refrigerant.

A refrigeration system typically includes a compressor, a condenser, an evaporator, and a flow control valve which meters the flow of refrigerant to the evaporator and converts liquid refrigerant to a mixture of liquid and vapor. The flow control valve is positioned upstream of the evaporator where it functions as an expansion valve for converting high pressure, sub-cooled liquid refrigerant into a low pressure, low-temperature mixture of liquid and vapor. Also, a flow control valve could be positioned downstream of the evaporator (i.e., between the evaporator and the compressor) where it functions as a suction valve for regulating evaporation pressure in the evaporator.

The flow control valve typically comprises fluid inlet and outlet passages interconnected by a connecting port that is bordered by a valve seat. A valve element is arranged be moved toward and away from the valve seat by an actuator, such as an electric solenoid or stepping motor.

When such a flow control value is being used as a suction valve in a refrigeration system, the size of the connecting port must be large enough to accommodate an ample flow therethrough during conditions of low pressure drops. Due to its relatively large size, it is difficult to maintain a precisely metered flow through the connecting port when the valve is opened only slightly. For example, during periods of high refrigeration demands, the suction valve should be opened only slightly (e.g., at 2.5–3.5% of maximum opening). Under those conditions, a slight inaccuracy in the amount of valve openness can produce a relatively large change in fluid flow. Achieving a precise flow is made even more difficult if the actuator is a stepping motor which can position the valve element in a only limited number of positions. In the event that the compressor is being driven by an internal combustion engine, a flow rate which is too low or even terminated, may cause the internal combustion engine to be choked.

A different problem may be encountered when a refrigeration system is shipped from a manufacturer to a customer, since there may be refrigerant in a portion of the refrigerant line situated between the expansion valve or suction valve and another valve. If the system were exposed to high enough temperatures, the refrigerant pressure could increase to such a degree that one of the valves or the piping could break.

Therefore, it is an object of the invention to provide a flow control valve capable of providing a precisely metered low flow.

Another object is to provide such a flow control valve that is actuated by a stepper motor.

Still another object is to provide such a flow control valve that can function as either an expansion valve or a suction valve in a refrigeration system.

A further object is to provide a flow control valve that can relieve high pressures generated by high temperatures encountered by the system, e.g. when being shipped or stored.

SUMMARY OF THE INVENTION

At least some of the objects of the present invention are achieved by a flow control valve which comprises a valve body and a valve mechanism. The valve body defines a fluid inlet section, a fluid outlet section, and a connecting port interconnecting the inlet and outlet sections. The valve mechanism comprises an actuator, a valve element, and a bleed closure. The valve element is operably connected to the actuator to be moved thereby selectively in port-opening and port-closing directions for respectively opening and closing the connecting port. The valve element includes a bleed passage extending therethrough for communicating the fluid inlet section with the fluid outlet section. The bleed closure is operably connected to the actuator and is movable thereby relative to the valve element for opening the bleed passage with the valve element in a port-closing position.

Preferably, the bleed closure is mounted on the valve element and arranged to transmit port-opening and port-closing movements from the actuator to the valve element. The bleed closure is arranged to be opened by an initial phase of the port-opening movement prior to transmitting the port-opening movement to the valve element.

The valve mechanism preferably further comprises a balancing passage extending therethrough for equalizing pressures at the port-closing end and an opposite end of the valve element. The bleed passage and the balancing passage include a common passage section which includes a slit formed in the port-closing end of the valve element.

Another aspect of the invention pertains to a flow control valve which comprises a valve body and a valve mechanism. The valve body defines a fluid inlet section, a fluid outlet section and a connecting port interconnecting the inlet and outlet sections. The valve mechanism comprises an actuator and a valve unit operably connected to the actuator to be moved thereby along a longitudinal axis extending through a center of the connecting port and including a port-sealing surface. The valve unit is movable along the axis between a forward port-closing position and a rearward port-opening position. The valve unit include front and rear ends interconnected by a pressure balancing passage. A front portion of the pressure balancing passage comprises a slit formed in a front end surface of the valve unit and extending thereacross in a direction transversely of the longitudinal axis from the axis to a periphery of the valve unit. The slit extends along the longitudinal axis from the front end surface to a location at least halfway from a forwardmost portion of the front end surface to the port-sealing surface.

Yet another aspect of the invention involves a flow control valve comprising a valve body defining a fluid inlet section, a fluid outlet section, and a connecting port interconnecting the inlet and outlet sections. A valve mechanism is connected to the valve body and comprises an actuator and a valve unit connected to the actuator to be moved thereby selectively in port-opening and port-closing directions for respectively opening and closing the connecting port. The valve unit includes a valve element including a bleed passage extending therethrough for communicating the fluid inlet section with the fluid outlet section, and a bleed closure operably connected to the actuator and movable thereby relative to the valve element for opening the bleed passage with the valve element in a port-closing position. The bleed closure includes a seal face arranged to close the bleed passage, and an elastomeric material disposed on the seal face and being of sufficient flexibility to open the bleed passage in response to pressure higher than normal system operating pressure.

Another aspect of the invention relates to a flow control valve which comprises a valve body defining a fluid inlet section, a fluid outlet section, and a connecting port interconnecting the inlet and outlet sections. The connecting port includes a valve seat. A valve mechanism is connected to the valve body and comprises an actuator and a valve unit connected to the actuator to be moved thereby selectively in port-opening and port-closing directions for moving a sealing surface of the valve element against and away from the valve seat for respectively opening and closing the connecting port. A bleed passage is arranged for interconnecting the fluid inlet and outlet sections when the sealing surface is seated against the valve seat, for permitting a flow of bleed fluid from the inlet section to the outlet section. A bleed closure is provided for opening and closing the bleed passage. The bleed closure is operably connected to the actuator for being opened thereby past a threshold position wherein the bleed closure does not restrict the flow of bleed fluid through the bleed passage.

BRIEF DESCRIPTION OF THE DRAWINGS

The objects and advantages of the invention will become apparent from the following detailed description of preferred embodiments thereof in connection with the accompanying drawings in which like numerals designate like element.

DESCRIPTION OF PREFERRED EMBODIMENTS

Figure 1:
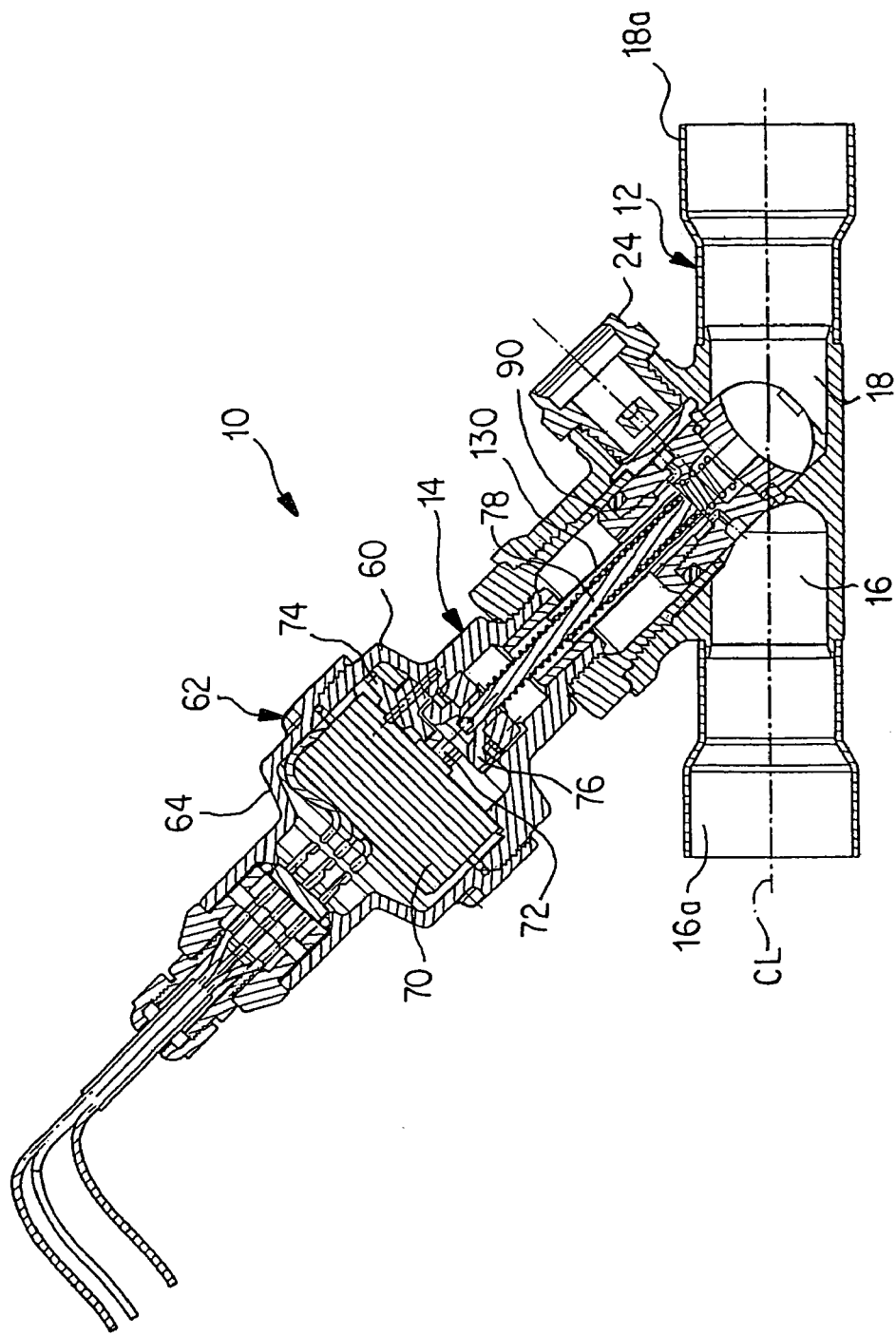
FIG. 1 is a longitudinal sectional view taken through a flow control valve according to the present invention.

Depicted in FIG. 1 is a flow control valve 10 which includes a valve body 12, and a valve mechanism 14 connected thereto for controlling fluid flow through the valve body. The flow control valve 10 is ideally, but not exclusively, suited for use in a refrigeration system in which it can be employed either as an expansion valve disposed upstream of an evaporator for controlling the delivery of liquid refrigerant to the evaporation, or as a suction valve disposed downstream of the evaporator for controlling the evaporation pressure in the evaporator.

In that regard, the valve body forms a pair of fluid flow sections 16, 18 either of which can serve as a flow inlet section or a flow outlet section. For instance, when the flow control valve 10 functions as an expansion valve, the flow section 16 would constitute a fluid inlet section and the flow section 18 would constitute a flow outlet section. Conversely, if the flow control valve were to be employed as a suction valve, the flow section 18 would constitute a flow inlet section and the flow section 16 would constitute a flow outlet section. The flow sections 16, 18 are aligned along a center line CL, and each of the flow sections 16, 18 is attached to a respective conduit 16a, 18a.

Figure 2:
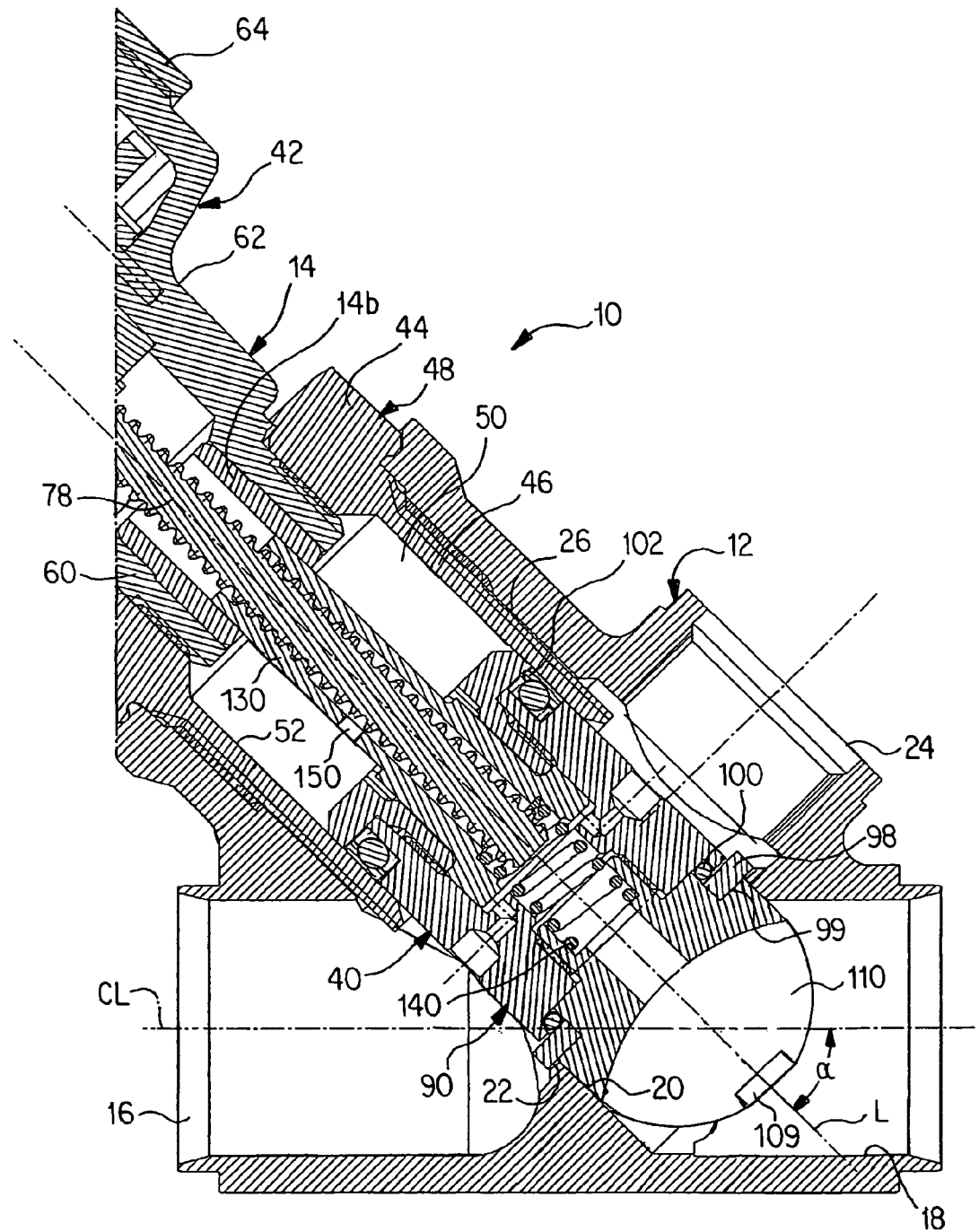
FIG. 2 is an enlarged fragmentary view of FIG. 1, with a valve element in a closed state, and with a bleed passage in an open state.

With reference to FIG. 2, it can be seen that the valve body 12 includes a connecting port 20 which communicates the flow sections 16, 18 with one another. The connecting port 20 is bordered by a valve seat 22. The valve body 12 also forms a sight glass opening 24 and a valve space 26.

The valve mechanism 14 comprises a valve unit 40 and an actuating mechanism 42 for displacing the valve unit.

The actuating mechanism 42 is secured to the valve body 12 via a sealing sleeve 44 which includes an externally threaded guide shank 46 and an internally threaded head 48. The shank 46 is threadedly secured within the valve space 26 of the valve body 12 to form a chamber 50 bordered by a cylindrical guide surface 52 of the guide shank 46. The cylindrical guide surface defines a longitudinal axis L that passes through the center of the connecting port and forms an oblique angle a with the center line CL.

Threadedly mounted in the head 48 is a lower portion 60 of a motor housing 62 of the actuating mechanism. An upper portion 64 of the housing is threadedly connected to the lower housing portion 60 to form therewith a compartment in which an actuator is mounted, the actuator preferably comprising an electric stepper motor 70. The stepper motor 70 includes an output shaft 72 having gear teeth meshing with the gear teeth of a pinion gear 74. The pinion gear 74 also includes teeth that mesh with a spindle gear 76 in which the upper end of an externally threaded drive spindle 78 is fixed. The drive spindle 78 is connected to the valve unit 40 and is rotatable by the stepper motor 70 about an axis of rotation which coincides with the longitudinal axis L of the chamber 50, in order to slide the valve unit 40 selectively in a forward port-closing direction toward the connecting port 20 or in a rearward port-opening direction away from the connecting port 20.

Figure 3:
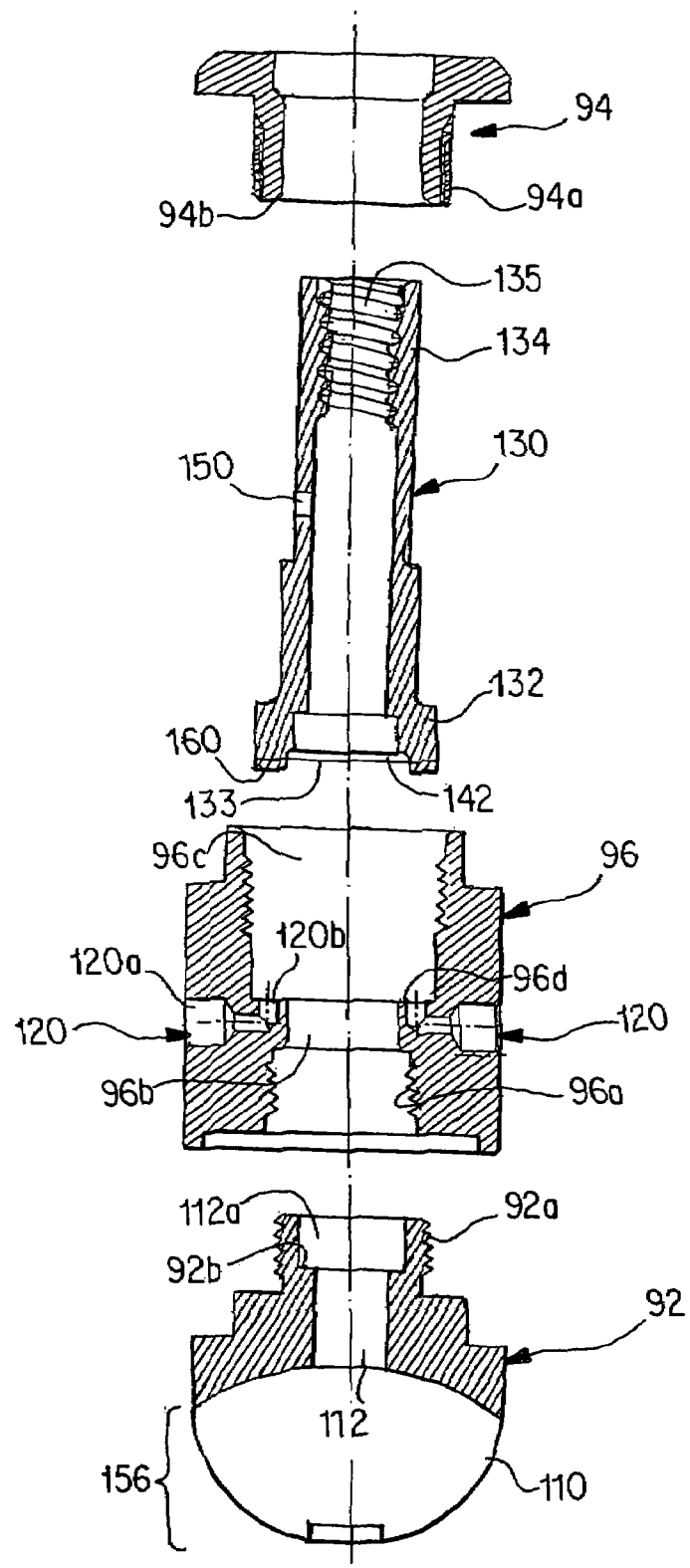
FIG. 3 an exploded longitudinal sectional view through a valve unit of the flow control valve.

The valve unit 40 includes a piston-like valve element 90 comprised of a front part 92, a rear part 94, and an intermediate part 96 releasably attached together (see FIG. 3). The intermediate part includes a through-hole extending axially therethrough, the through-hole including first, second, and third portions 96a, 96b, 96c. The first hole portion 96a is internally threaded and receives an externally threaded portion 92a of the front part 92. The third hole portion 96c is internally threaded and receives an externally threaded portion 94a of the rear part 94. The second hole portion 96b is of smaller cross section than the third hole portion 96c so that a rearwardly facing ledge 96d is formed which surrounds the second hole portion 96b.

Sandwiched between the front and intermediate parts 92, 96 is a sealing disk 98 and an O-ring seal 100 (see FIG. 2). A forwardly facing surface 99 of the sealing disk constitutes a sealing surface adapted to sealingly engage the valve seat 22.

Formed between the rear and intermediate parts 94, 96 is a seal space in which an annular sealing element 102 and an annular biasing O-ring 104 are disposed. The O-ring 104 biases the sealing element radially outwardly against the guide surface 52 of the guide shank 46.

Figure 5:
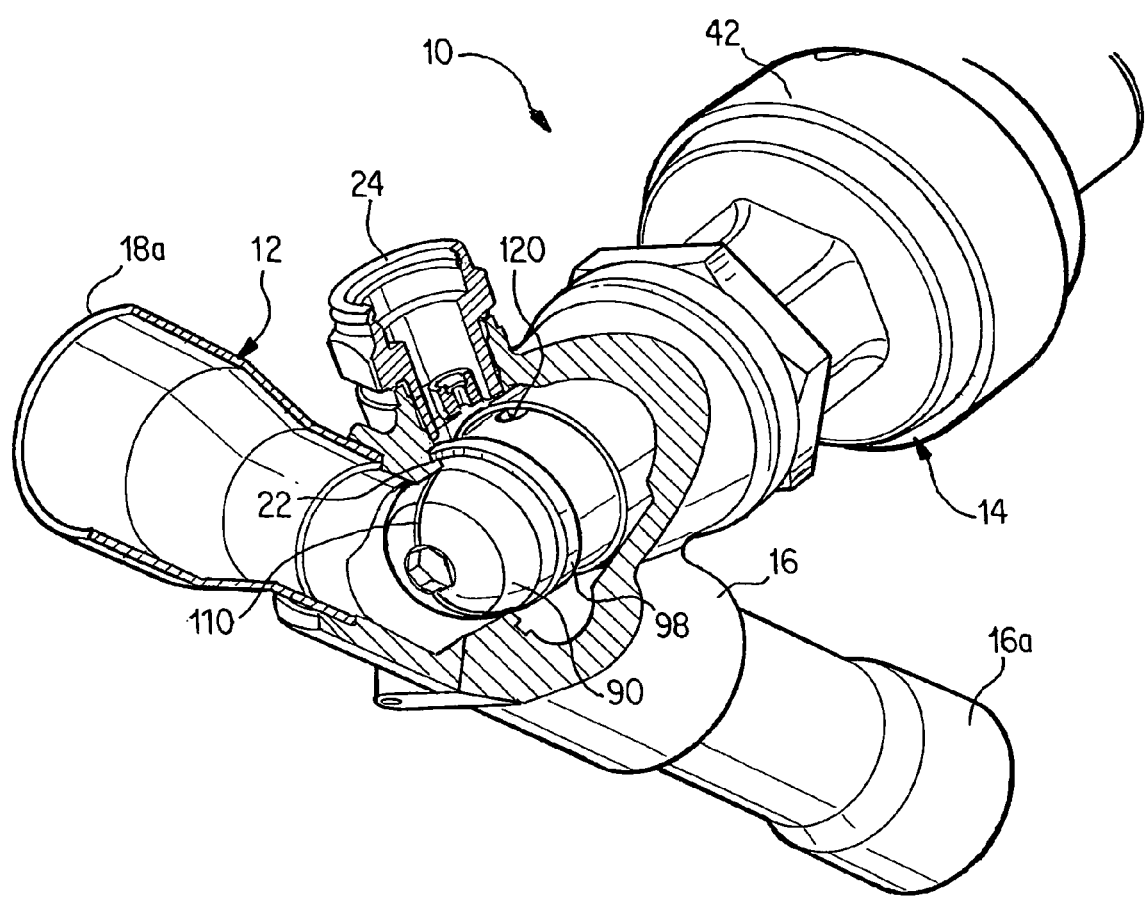
FIG. 5 is a front perspective view of the flow control valve mechanism, partly broken away to reveal the front end of a valve unit.

Formed in a front end or so-called cone portion of the front part 92 is a center recess 109 and a slit 110 which extends diametrically across the front part 92, i.e., in a direction transversely of the longitudinal axis, as can be seen in FIGS. 2 and 5. The slit extends in the direction of the axis L for a distance terminating short of the sealing surface of the sealing disk 98. The slit 110 communicates with a center bore 112 which extends axially through the front part and which includes an enlarged portion 112a that communicates with the through-hole 96a–c extending through the intermediate part 96. Preferably, the slit 110 extends from the front end of the valve element along the axis to a location at least half-way from a forwardmost part of the valve element to the sealing surface 99.

The recess 109 is shaped to receive a turning tool, such as an Allen wrench, in order to be able to rotate the front part 92 of the valve element 90.

As pointed out earlier, during periods of high cooling loads when the valve assembly is employed as a suction valve (i.e., when the fluid flow sections 18, 16 constitute inlet and outlet flow sections, respectively), the valve element should close the connecting port 20 except for admitting a small flow of refrigerant from the inlet section 18 to the outlet section 16. In accordance with the present invention, this is accomplished in a precisely controllable manner by the provision of at least one closable bleed passage extending through the valve element from the inlet section 18 to the outlet section 16. Two bleed passages are depicted, each of which includes a bleed channel 120, one end (outlet end) 120a of which opens in a side of the intermediate part 96 communicating with the inlet flow section 16, and an opposite end 120b (inlet end) of which opens in the rearwardly facing ledge 96d of the intermediate part 96. Thus, each bleed passage is formed sequentially by the respective bleed channel 120, the third hole portion 96c of the intermediate part, the second hole portion 96b of the intermediate part, the bores 112, 112a of the front part 92, and the slit 110 of the front part 92.

The valve unit 40 further includes a bleed closure for selectively opening and closing the bleed passages. The bleed closure is preferably in the form of a hollow bleed piston 130 mounted in the valve element 90 for limited axial movement relative thereto along the axis L. The bleed piston 130 includes a front head 132 mounted in the third hole portion 96c of the intermediate part and disposed axially between a front abutment formed by the shelf 96d of the intermediate part 96 and a rear abutment formed by the front end 94b of the rear part 94. The head 132 includes a forwardly facing seal face 133. The distance between the shelf 96d and the front end 94b is longer than the length of the front head 132, allowing the bleed piston 130 to reciprocate axially relative to the valve element 90 between front and rear abutments defined by the ledge 96d and the third part's front end 94b, respectively.

A coil compression spring 140 is mounted in front of the bleed piston 130. A front end of the spring 140 bears against a step 92b of the valve element 90, and a rear end of the spring is disposed in a recess 142 formed in the head 132 of the bleed piston 130. Thus, the spring acts between the valve element 90 and the bleed piston 130 to bias the bleed piston axially rearwardly, away from the ledge 96d, for a reason to be explained.

The bleed piston further includes a rear shank 134 that has an internally threaded hole 135 receiving the externally threaded drive spindle 78 of the actuating mechanism. The rear shank 134 is slidably mounted in a bushing 146 mounted in the lower portion 60 of the motor housing (see FIG. 2). By rotating the drive spindle 78 in one direction, i.e., a port-closing direction, the bleed piston 130 is displaced axially forwardly, whereby an axially forward force is transmitted from the bleed piston to the valve element 90 through the spring 140 to displace the valve element 90 forwardly toward the connecting port 20. When the sealing disk 98 contacts the valve seat 22, continued rotation of the drive spindle 78 in the port-closing direction causes the bleed piston 130 to move forwardly relative to the valve element 90, until the front seal face 133 of the bleed piston head 132 abuts the ledge 96d to close the bleed passages. Thus, no fluid can pass between the flow sections 16, 18.

In the event that a slight but measured amount of fluid flow is desired, e.g., during the high load condition when the valve mechanism is functioning as a suction valve, the actuator can be actuated to rotate the drive spindle in a port-opening direction, i.e., in a direction which displaces the bleed piston axially rearwardly relative to the valve element 90, until the head of the bleed piston 130 contacts the rear abutment 94b. The bleed passages are thereby opened, enabling a slight but measured fluid flow to pass through the valve assembly. In this state, the spring 140 functions to press the head of the bleed piston firmly against the rear abutment 94b to prevent the bleed piston from "chattering" as might otherwise be permitted by axial "play" existing between the threads of the spindle 78 and the bleed piston 130. It will be appreciated that any suitable elastic element could be used to perform the spring function.

Figure 4A:
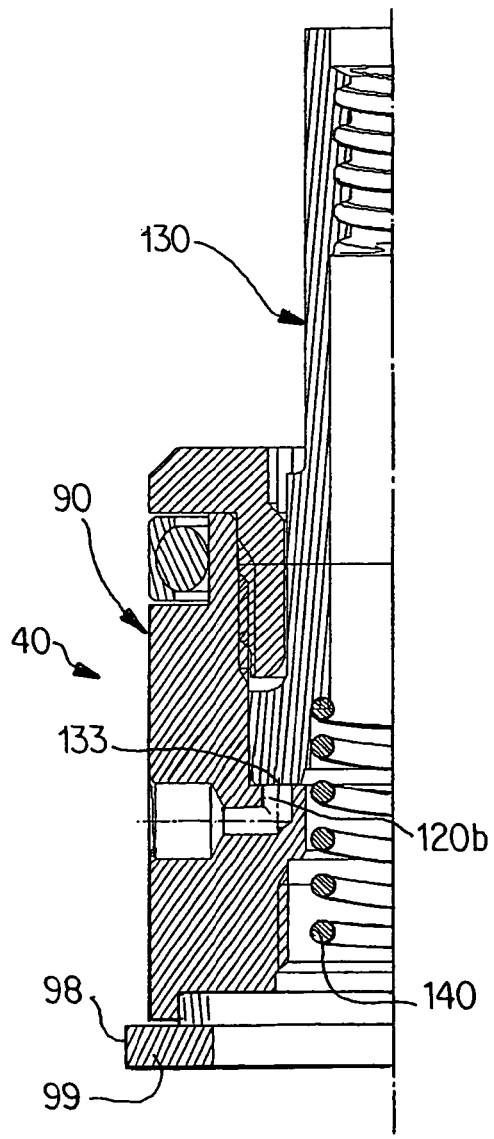
FIG. 4A is a fragmentary longitudinal sectional view through the left side of the valve unit, with a bleed passage shown in a closed state.
Figure 4B:
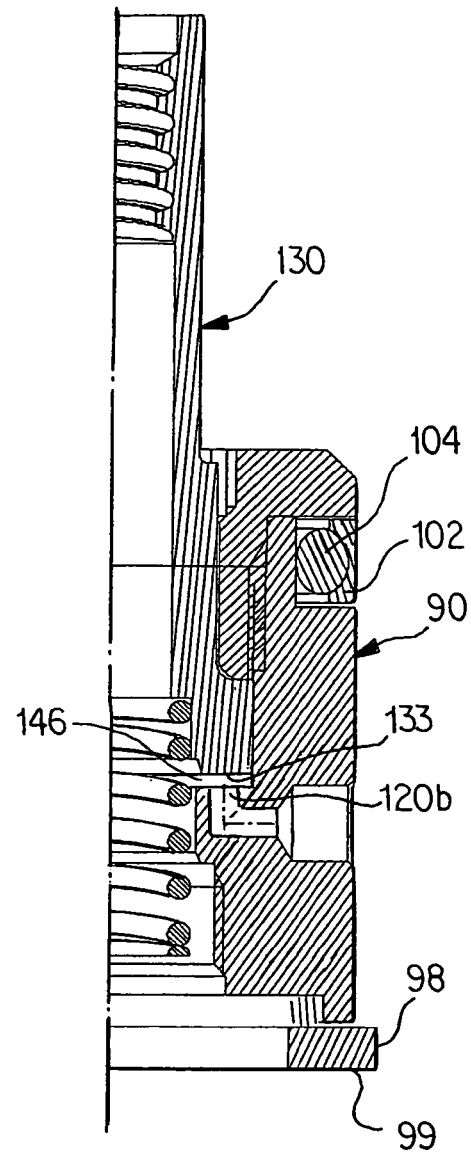
FIG. 4B is a fragmentary sectional view taken through the right side of the valve unit with the bleed passage shown in an open state.

The bleed piston is moved to a fully open state in response to a predetermined number of incremental "steps" of the stepper motor. As the bleed piston opens, the seal face 133 of the bleed piston 130 lifts off the shelf 96d, thereby causing the hole portion 96c to form a progressively enlarging bridging section 146 (FIG. 4) of the bleed passage which interconnects upstream and downstream sections of the bleed passage, i.e., the portion 96c of the bleed passage is connected with the inlet ends 120b of the bleed channels 120.

It will be appreciated that during the initial stages of the opening movement of the bleed closure, the bridging section 144 will be small enough to impose a restriction to the bleed flow. That is, the rate of flow through the bleed passage is being determined by the bleed closure. However, once the bleed closure passes a threshold position, the bridging section 146 will be large enough that it imposes no restriction to the bleed flow, whereby the rate of bleed flow is determined by the configuration of the bleed passage itself. Therefore, it is assured that by actuating the stepper motor a sufficient number of steps to move the bleed closure past the threshold position, a precisely metered bleed flow predetermined by the design of the bleed passage will result.

Further rotation of the drive spindle 78 in the port-opening direction causes the bleed piston to travel rearwardly and press against the rear abutment 94b to pull the valve element 90 rearwardly to separate the sealing disk 98 from the valve seat 22 if it is desired to open the port.

In order to close the connecting port entirely, the drive spindle is caused to rotate in the port-closing direction, whereupon the bleed piston 130 moves forwardly and contacts the ledge 96d to close the bleed passages and then, as the drive spindle continues to be rotated, pushes the valve element 90 forwardly until the sealing disk 98 contacts the valve seat 22.

It will be appreciated that when the valve element is in a port-closing state, it is desirable that the forces acting against the front and rear ends of the valve element be balanced as much as possible in order to minimize the forces acting on screw drive between the stepper motor and the valve unit 40. Balancing can be achieved by communicating the fluid pressure acting at the front end of the valve unit with the rear end of the valve unit, and by making the surface areas of the front and rear ends of the valve unit of generally equal magnitudes.

In the present invention, the pressure communication between the front and rear ends of the valve unit is achieved by the presence of a balancing passage which communicates the front end with the rear end. That balancing passage is formed by the slit 110, the bores 112, 112a, the second hole portion 96b, the center bore 135 of the bleed valve's rear shank 134, and a lateral hole 150 formed in the rear shank 134, which lateral hole opens into the chamber 50 behind the valve element 90. Thus, a portion of the balancing passage is common to the bleed passage. Furthermore, as the valve element is moved to the port-opening position, each lateral side 156 of the slit (see FIG. 3) comes into communication with a region of progressively reduced fluid pressures, i.e., a pressure gradient, and an average value of that pressure gradient is transmitted to the rear end of the valve element via the balancing passage. Thus, the pressure acting against the rear end of the valve element is reduced, which serves to at least partially compensate for the reduction in the rearward force being applied against the front end of the valve element by the fluid. This tends to produce a dynamic balancing of the valve element as it opens and closes. That tendency toward dynamic balancing is similar to what occurs in a valve disclosed in U.S. Pat. No. 3,700,209, which valve has a series of lateral holes in the front of the valve to communicate the balancing passage with a pressure gradient as the valve moves. However, a slit 110 is easier to produce than a series of holes and does not require the manufacturing precision specified in U.S. Pat. No. 3,700,209.

The slit 110 is shown as extending completely across the diameter of the valve element. Alternatively, the slit could extend across only one-half of the diameter, i.e., from the center axis to the outer periphery of the valve element, or there could be a series of such slits that are not diametrically aligned with one another.

Figure 6:
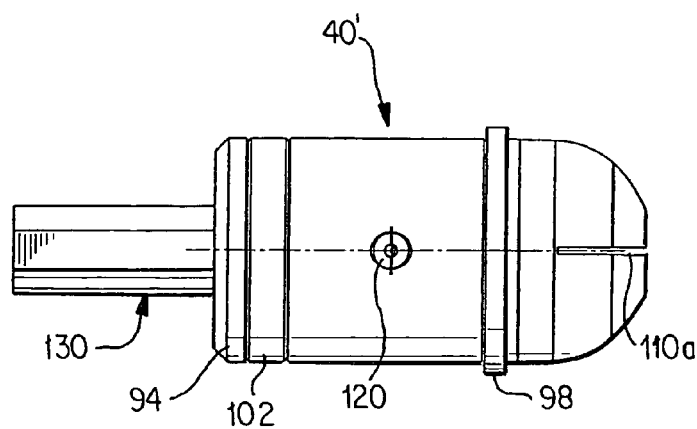
FIG. 6 is a side elevational view through a modified valve unit.
Figure 7:
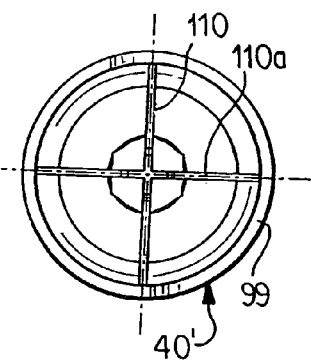
FIG. 7 is a front end view of the valve unit of FIG. 6.
Figure 8:
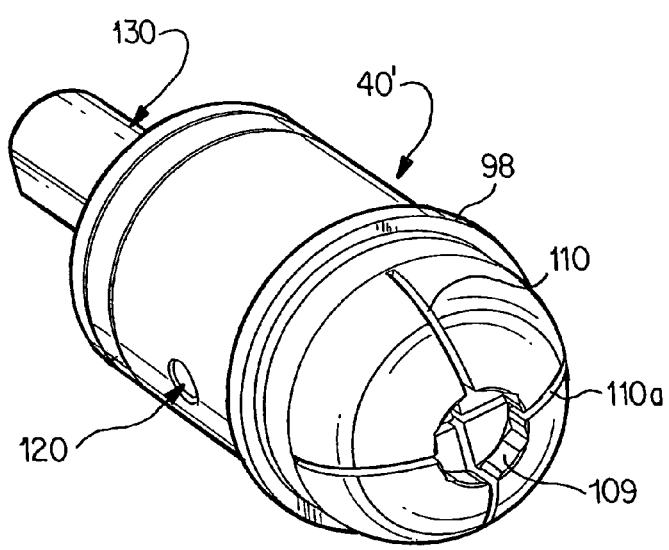
FIG. 8 is a front perspective view of the valve unit of FIG. 6.

Shown in FIGS. 6–8 is a valve unit 40' which is identical to the valve unit 40, except that there is an additional slit 110a formed therein at a right angle to the slit 110. It will be appreciated that any suitable pattern of slits could be formed in the valve element.

An optional feature of the valve involves providing an annular washer-like member 160 on the front end of the bleed piston 130 (see FIG. 3). The washer-like member 160 is formed of a readily flexible elastomeric material, such as neoprene. When such a member 160 is provided on the bleed piston 130, which could be formed of PBT (polyburthylene terephthalate), the controller which regulates the operation of the motor 70 is set so that a pressure applied to the bleed piston when in a port-closing position is not so great as to prevent a flexing of the member 160 under very high pressure. The importance of this feature is realized for example in case that the valve mechanism 10 is arranged as an expansion valve or a suction valve in a refrigeration system that is being shipped or stored while charged with a refrigerant. If that system should be subjected to high temperatures, refrigerant trapped between the valve mechanism 10 and another valve in the system could expand and create very high pressures that can damage the system. However, if the bleed piston 130 were provided with the flexible member 160, that member could be flexed by the highly pressurized fluid to enable the pressure build-up to be relieved through the bleed passage. The member 160 would not be so flexible as to be openable by the fluid pressures encountered during normal operation.

It will be appreciated that the valve mechanism according to the present invention allows for a small but measured flow to occur through the valve if necessary. Also, pressure build-ups in a stored or shipped refrigeration system can be relieved. Additionally, a valve element exhibiting a degree of dynamic balancing can be provided in a simplified manner.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A flow control valve comprising:
   a valve body defining a fluid inlet section, a fluid outlet section, and a connecting port interconnecting the inlet and outlet sections; and
   a valve mechanism connected to the valve body and comprising an actuator and a valve unit connected to the actuator to be moved thereby selectively in port-opening and port-closing directions for respectively opening and closing the connecting port, the valve unit including:
      a valve element including a bleed passage extending therethrough for communicating the fluid inlet section with the fluid outlet section, and
      a bleed closure operably connected to the actuator and movable thereby relative to the valve element for opening the bleed passage with the valve element in a port-closing position;
   wherein the valve element includes a sealing surface for contacting a valve seat of the port; a portion of the bleed passage intersecting the port-closing end of the valve element and comprising at least one slit formed in the port-closing end and extending thereacross in a direction transversely of the longitudinal axis from the axis to an outer periphery of the valve element, the slit extending axially from the port-closing end of the valve element to a location at least halfway from a forwardmost part of the valve element to the sealing surface.

2. The flow control valve according to claim 1 wherein the bleed closure is mounted on the valve element and arranged to transmit port-opening and port-closing movements from the actuator to the valve element.

3. The flow control valve according to claim 2 wherein the bleed closure is arranged to be opened by an initial phase of the port-opening movement prior to transmitting the port-opening movement to the valve element.

4. The flow control valve according to claim 3 wherein the valve element comprises a valve piston movable along a longitudinal axis extending through the connecting port, and the bleed closure comprises a bleed piston movable along the axis for a limited distance relative to the valve piston.

5. The flow control valve according to claim 4 wherein the actuator comprises an electric stepper motor and a threaded spindle driven thereby, the spindle being directly connected to the bleed piston, the bleed piston being movable along the axis between axially spaced abutments of the valve piston.

6. The flow control valve according to claim 5, wherein the valve unit mechanism further includes an elastic element arranged for pressing the bleed closure against one of the abutments when the bleed passage is in an open state.

7. The flow control valve according to claim 6 wherein the elastic element comprises a coil spring having a center axis coinciding with the longitudinal axis, the coil spring including opposite ends bearing against the valve piston, and the bleed closure, respectively.

8. The flow control valve according to claim 1 wherein the fluid inlet and outlet sections are aligned along a common center line, the valve element arranged to move along a longitudinal axis passing through a center of the connecting port, the axis being oriented at an oblique angle relative to the center line, wherein a port-closing end of the valve element faces toward one of the inlet and outlet sections during movement thereof along the longitudinal axis, the valve unit further comprising a balancing passage extending therethrough for equalizing pressures at the port-closing end and an opposite end of the valve element.

9. The flow control valve according to claim 8, wherein the one of the inlet and outlet sections toward which the port-closing end faces is the outlet section.

10. The flow control valve according to claim 9 wherein a portion of the balancing passage coincides with a portion of the bleed passage.

11. The flow control valve according to claim 1 wherein the valve unit further comprises a balancing passage extending therethrough for equalizing pressures at the port-closing end and an opposite end of the valve element.

12. The flow control valve according to claim 1 wherein the slit extends completely diametrically across the port-closing end of the valve element.

13. The flow control valve according to claim 1 wherein the bleed closure is operably connected to the actuator for being opened thereby past a threshold position wherein the bleed closure does not restrict the flow of bleed fluid through the bleed passage.

14. A flow control valve comprising:
a valve body defining a fluid inlet section, a fluid outlet section, and a connecting port interconnecting the inlet and outlet sections, and a valve mechanism comprising:
an actuator, and
a valve unit operably connected to the actuator to be moved thereby along a longitudinal axis extending through a center of the connecting port and including a port-sealing surface, the valve unit being movable along the axis between a forward port-closing position and a rearward port-opening position, the valve unit including front and rear ends interconnected by a pressure balancing passage, a front portion of the pressure balancing passage comprising at least one slit formed in a front end surface of the valve unit and extending thereacross in a direction transversely of the longitudinal axis from the axis to a periphery of the valve unit, the slit extending along the longitudinal axis from the front end surface to a location at least half-way from a forwardmost part of the front end surface to the port-sealing surface.

15. The flow control valve according to claim 14 wherein the slit extends completely diametrically across the front end surface of the valve unit.

* * * * *